United States Patent Office 3,649,435
Patented Mar. 14, 1972

3,649,435
HIGH MODULUS GRAPHITE FIBER REINFORCED HYBRID LAMINATES
Mike Varlas, San Diego, Calif., assignor to General Dynamics Corporation, San Diego, Calif.
Filed May 18, 1970, Ser. No. 38,368
Int. Cl. B32b 5/12, 19/06, 19/02
U.S. Cl. 161—156                 6 Claims

ABSTRACT OF THE DISCLOSURE

A resin impregnated lamina structural material including graphite reinforcing fibers and inorganic papers or mats such as asbestos, asbestos-glass papers or mica mat. Fabrication of the lamina is accomplished by impregnating the chrysotile asbestos paper or mica mat with synthetic resinous matrices using solvent, film, or vacuum-pressure impregnating techniques and laminating the hybrid lamina to form laminates having improved thermal physical properties.

BACKGROUND OF THE INVENTION

The invention relates to a structural lamina material characterized by the use of chrysotile asbestos type papers or mica mat in combination with high strength, high Young's modulus graphite fibers to form hybrid composite laminates of novel character. The fiber characteristics of such laminates complement and enhance each other as contrasted with the deficiencies prevalent in resinous laminates reinforced with the various graphite fibers alone. Differential expansion between the graphite fiber, resin matrix and associated fabrication tooling is minimized by the present invention as a result of the laminates and structural composites being considerably more stable during fabrication as well as under actual operating conditions. In typical applications involving the use of these laminates, it is not unusual to encounter temperature environments of great magnitude wherein the inherent thermal stability is a vital factor to the design of structural assemblies as well as individual components. Moreover, the mechanical strength of these laminates and structural composites are further enhanced by the intralamina reinforcing effect which the asbestos paper or mica mat contributes to the transverse strength of the laminates.

SUMMARY OF THE INVENTION

The hybrid composite material of the present invention is comprised of laminae of high strength, high Young's modulus, graphite fibers, combined with laminae of inorganic papers or mats such as chrysotile asbestos paper or mica mat by impregnating with synthetic resinous matrices to form a laminate of superior mechanical strength and thermal properties. Structural members of various configurations may be thus fabricated by interleaving individual laminae of graphite fibers with asbestos paper or mica mat to develop the strength and thickness desired. The invention further contemplates orienting the graphite fibers from 0 to 90 degrees with respect to the orientation of the asbestos paper or mica mat. Accordingly the mechanical strength of the laminate in a particular direction may be increased by varying the orientation of the graphite fibers in one or more of the individual laminae.

An object of the present invention is to provide a lamina material of improved thermally stable characteristics.

Another object of this invention is to provide a lamina material of superior mechanical strength.

A further object of this invention lies in the ability of the lamina material to retain its inherent strength in cryogenic and high temperature environments.

A still further object of this invention lies in the ability of the lamina material to remain dimensionally stable under load and cryogenic and elevated temperature conditions.

Yet another object of this invention is to provide a high Young's modulus graphite fiber reinforced lamina material capable of being manufactured in a multitude of configurations and complex shapes.

Another object of this invention is to provide a structural lamina material capable of being cured under heat and pressure employing conventional equipment for forming flat or corrugated sheet material which may be subsequently laminated using metallic or non-metallic matrix systems in the fabrication of honeycomb or corrugated core, tubes, beams, or structural skins.

Other and further objects will be apparent from the description which follows.

Figure 1:
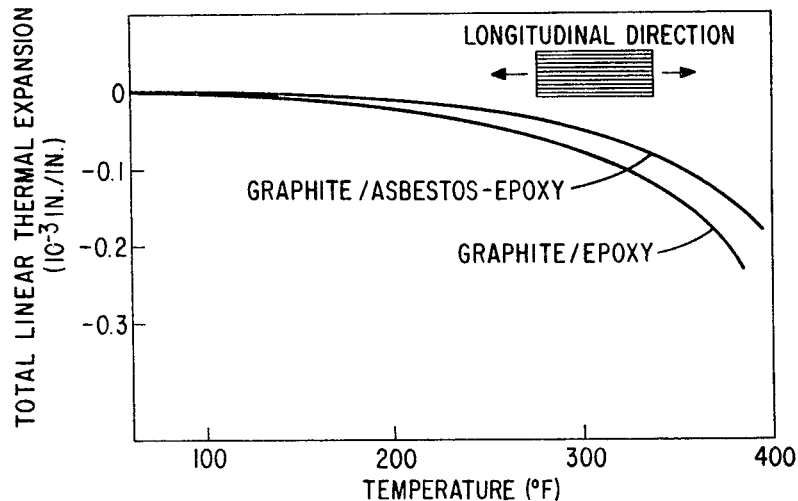
FIG. 1 is a chart illustrating the thermal expansion properties in a longitudinal direction of graphite/epoxy and graphite/asbestos-epoxy.
Figure 2:
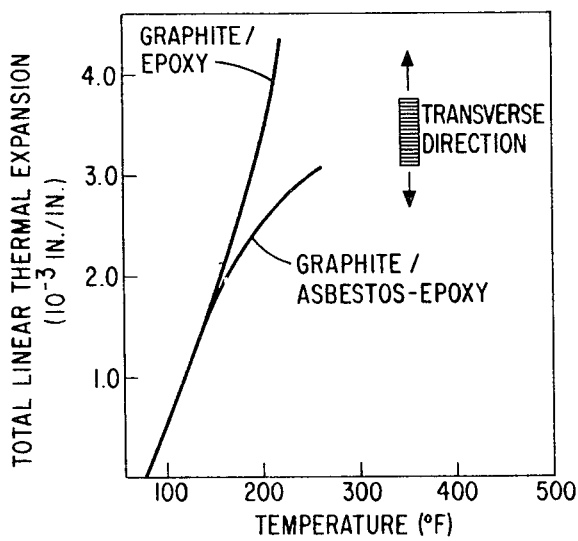
FIG. 2 is a chart illustrating the thermal expansion properties in a transverse direction of graphite/epoxy and graphite/asbestos-epoxy.

In carrying out the present invention, chrysotile asbestos paper containing approximately 15% to 20% chopped glass fibers was combined with high strength and/or high Young's modulus graphite filaments of approximately .0003 inch diameter. This combination yielded a unique structural material in that a significant increase of more than 600% in transverse, tensile, compression, flexural, and intralaminar shear strengths was obtained above those of graphite fiber reinforced resin laminates lacking the asbestos interlayer reinforcement. The resin systems employed in the lamination process included epoxy, epoxy-phenolic, and polyimide. The asbestos fiber embodied in the interlayer reinforcing paper is a chrysotile type having typical properties such as small fiber diameter (017 to $1.1 \times 10^{-6}$ inch), large surface area (130,000 to 200,000 sq. cm. per g.), fibrils in one linear inch (850,000 to 1,400,000), and a thermal coefficient (2 to $4 \times 10^{-6}$ in./in./° F. in laminate, RT to 600° F.). This particular asbestos paper was selected for its low cost in improving the thermal physical properties of high strength, high Young's modulus graphite fiber reinforced resin laminates. The thermal expansion properties of the typical graphite fibers of the present invention are extremely low ($-0.4 \times 10^{-6}$ in./in./° F.) creating problems during the curing of the resin matrix that itself has a typical thermal expansion of greater value ($30 \times 10^{-6}$ in./in./° F.). As a result of the expansion differential between the graphite fiber and resin matrix, and inherent thermal stress is created in the laminate often causing cracks or delaminations to appear in the graphite fiber reinforced resin composites. The use of chrysotile asbestos paper for interlayer reinforcement results in a hybrid graphite fiber composite having improved thermal expansion characteristics. A comparison of the thermal expansion properties is shown in FIGS. 1 and 2.

It is an inherent characteristic of chrysotile asbestos paper to be of greater strength in one direction than another. In order to effect maximum transverse strength, the asbestos paper is usually oriented with its greater strength being normal to the direction of the parallel graphite fibers. However, in multi-oriented ply laminates such as 0°, ±45°, 90°, the greater strength direction of the asbestos paper is frequently oriented parallel to the graphite fibers to facilitate the use of continuous type tape dispensed by automated tape laying machines rather than hand layup of widegoods. In the fabrication of graphite/asbestos/resin impregnated widegood laminates, two basic techniques are usually employed. One involves the lay-up of resin impregnated asbestos paper on a winding drum with the application of pressure from winding tension, vacuum-bag, etc. causing the resin from the asbestos to impregnate the graphite fiber overlay. This method may also be reversed, i.e., the graphite fibers may be first placed on the winding drum with the asbestos paper as the overlay. The second technique is to resin impregnate the graphite fibers and asbestos paper separately and combine them simultaneously or as a separate operation. Also, combinations of these techniques have also been successfully employed in fabricating structural components with the use of conventional equipment in both tapes and widegoods application.

In early evaluation of graphite fiber reinforced resin composites, approximately eight percent by volume of chrysotile asbestos paper was used. More recent evaluations embodied approximately four percent by volume of the asbestos paper for use in select structural applications. In other evaluations, four mil thick mica mat was substituted for the asbestos paper with results for both the asbestos paper and mica mat composites proving to be of the same magnitude of excellence.

EXAMPLE 1

Graphite-asbestos/epoxy-phenolic laminates

Single asbestos fibers are similar to glass fibers in that they are non-plastic in behavior. However, because of their very small diameter, they are extremely flexible. They have good oxidation resistance and improve the high temperature strength properties of graphite composites.

Figure 3:
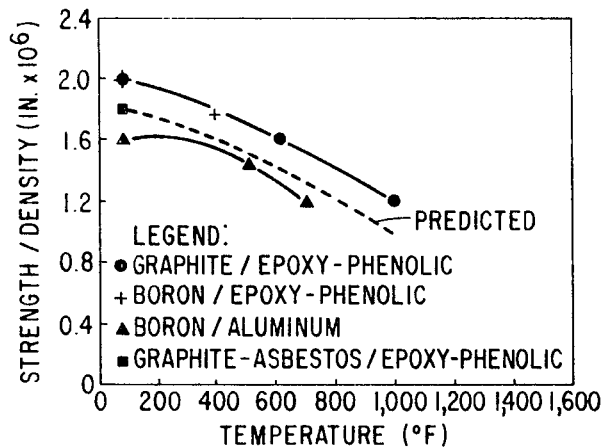
FIG. 3 is a chart illustrating the uniaxial strength ($F_{tu}$)-to-weight ratio versus temperature of graphite/epoxy-phenolic, boron/epoxy-phenolic, boron/aluminum, and graphite/asbestos/epoxy-phenolic composites.
Figure 4:
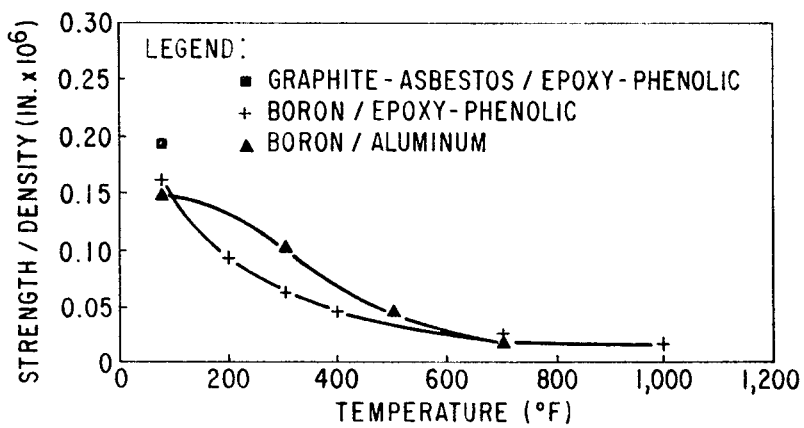
FIG. 4 is a chart illustrating the transverse strength ($F_{tu}$)-to-weight ratio versus temperature of graphite/asbestos/epoxy - phenolic, boron/epoxy - phenolic, and boron/aluminum composites.

Graphite reinforced epoxy-phenolic resin laminates have been evaluated for short-term high-temperature applications up to 1,000° F. Transverse tensile properties could not be determined for the unidirectional epoxy-phenolic laminates because of excessive warpage in the transverse direction. Use of asbestos papers in the construction of these laminates improved the fabrication procedure by reducing fiber movement, and stabilizing expansion variables and resulted in the development of a structurally competitive material. A comparison with typical advanced composite materials is shown in FIGS. 3 and 4. All of the graphite/asbestos reinforced epoxy phenolic laminates were of a 5-ply construction (graphite-asbestos-graphite-asbestos-graphite) with the asbestos oriented 0°, ±45°, or 90° to the parallel graphite filaments.

An average transverse tensile strength of over 9,500 p.s.i. was measured for the typical 5-ply laminate with the asbestos oriented in the 90° direction; while over 5,000 p.s.i. was measured when the asbestos paper was oriented parallel (0° direction) to the graphite filaments.

The ultimate axial tensile strength properties of the graphite/asbestos composites were slightly less than those measured for the unidirectional all graphite epoxy-phenolic laminates, but significantly higher than those noted for the 0°/90°, 5-ply all graphite composite.

A summary of tensile strength properties and stress vs. strain curves for the graphite and graphite/asbestos reinforced epoxy-phenolic laminates are given in Table 1.

TABLE 1.—SUMMARY OF GRAPHITE/ASBESTOS REINFORCED EPOXY-PHENOLIC LAMINATE TENSILE PROPERTIES

Laminate 0°, all graphite, 10 ply
Asbestos orientation, none
Sp. gr. (lbs./in.$^3$), 0.048
[Ultimate tensile]

| Axial (K s.i.) | Trans. (K s.i.) | E×10$^6$ p.s.i. |
|---|---|---|
| 106.4 | NA | 28.5 |
| 100.1 | NA | 29.1 |
| 100.9 | NA | 30.5 |

Laminate 0°/90° all graph., 5 ply (0°–90°–0°–90°–0°)
Asbestos orientation, none
Sp. gr. (lbs./in.$^3$), 0.050
[Ultimate tensile]

| Axial (K s.i.) | Trans. (K s.i.) | E×10$^6$ p.s.i. |
|---|---|---|
| 65.9 | | 15.1 |
| 68.6 | | 15.5 |
| 58.5 | | 15.2 |

Laminate 0°/90° graph./asb, 5 ply (G–ASB–G–ASB–G)
Asbestos orientation, 90°
Sp. gr. (lbs./in.$^3$), 0.051
[Ultimate tensile]

| Axial (K s.i.) | Trans. (K s.i.) | E×10$^6$ p.s.i. |
|---|---|---|
| 86.2 | | 15.9 |
| 93.3 | | 16.9 |
| | 9.7 | 1.3 |
| | 9.3 | 1.1 |
| | 9.5 | |
| | 10.1 | |

Laminate 0°/0° graph./asb, 5 ply (G–ASB–G–ASB–G)
Asbestos orientation, 0°
Sp. gr. (lbs./in.$^3$), 0.050
[Ultimate tensile]

| Axial (K s.i.) | Trans. (K s.i.) | E×10$^6$ p.s.i. |
|---|---|---|
| 97.1 | | 19.3 |
| 92.2 | | |
| 100.7 | | 19.5 |
| | 5.8 | 0.70 |
| | 5.6 | 0.70 |
| | 5.97 | 0.73 |

Laminate 0°/±45° graph./asb, 5 ply (G–ASB–G–ASB–G)
Asbestos orientation, −45°, +45°
Sp. gr. (lbs./in.$^3$), 0.051
[Ultimate tensile]

| Axial (K s.i.) | Trans. (K s.i.) | E×10$^6$ p.s.i. |
|---|---|---|
| 87.9 | | 16.6 |
| 91.1 | | 15.9 |
| 94.6 | | 17.4 |
| | 8.4 | 0.99 |
| | 8.3 | 0.94 |
| | 8.5 | 0.92 |

EXAMPLE 2

Tension field beam evaluation

Figure 5:
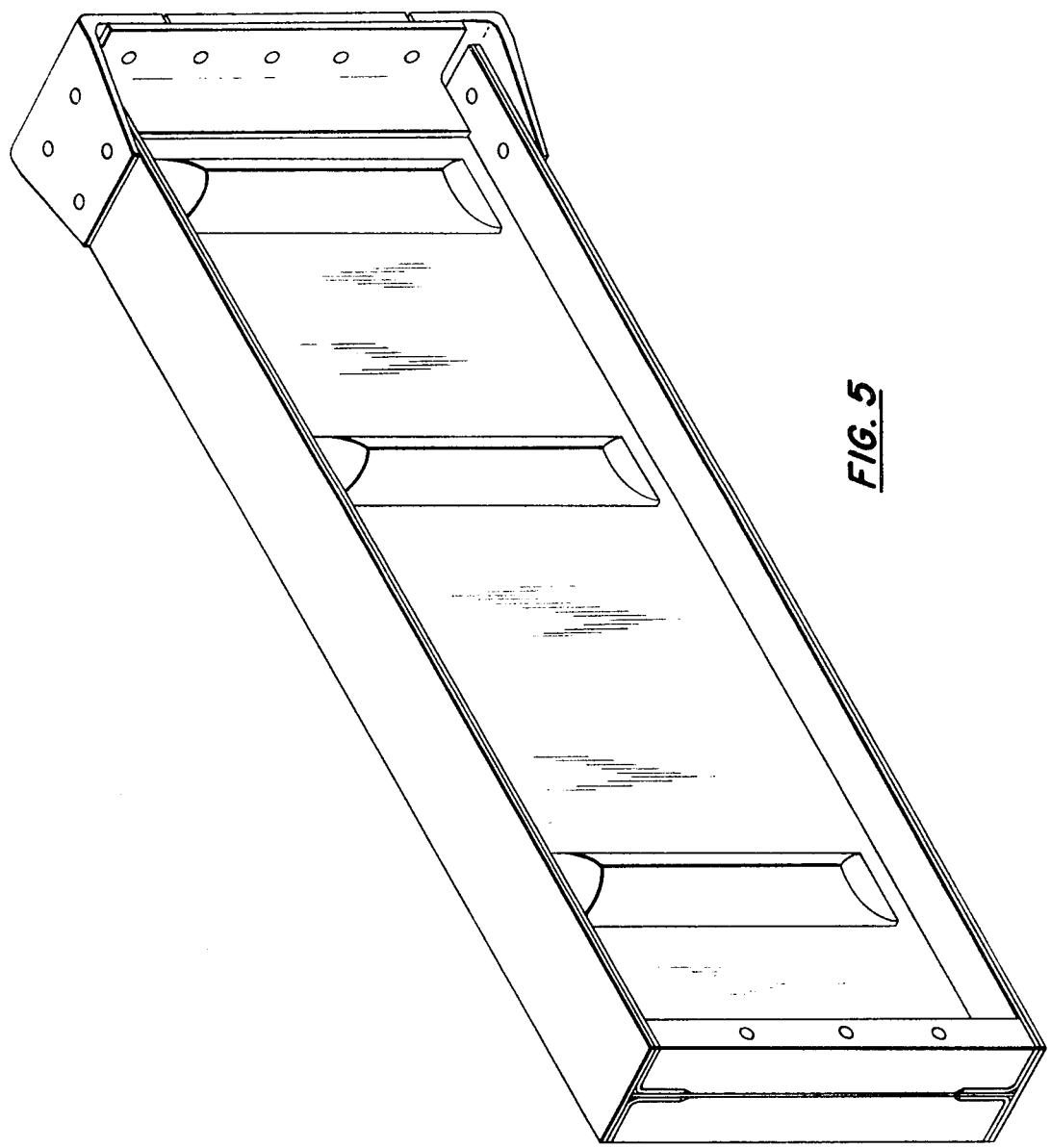
FIG. 5 is a perspective view of a tension field beam constructed to evaluate advanced composite materials used in aerospace and aircraft applications.

Tension field beams (FIG. 5) have been used to evaluate advanced composite materials for aerospace and aircraft structural applications.

Glass and graphite filament reinforced epoxy test beams were fabricated and tested. The general fabrication procedure for the epoxy resin composite (glass and graphite) tension field beams and the effect of using interleaved 3-mil asbestos paper in the web section of an epoxy-graphite test beam was also evaluated.

General fabrication procedure

The general fabrication procedure consists of four basic steps. They are:

(1) Layup and single stage curing of the ±45 oriented web section and unidirectional tension and compression cap sections. Curing may be accomplished by the vacuum-bag method.

(2) Layup and press cure of right-angle supports (vertical and compression cap supports).

(3) Layup and vacuum-bag curing of unidirectional stiffener laminates.

(4) Assembling of components by adhesive bonding and bolting methods.

The 3-mil asbestos used in the web section was preimpregnated with the same epoxy resin as the graphite fiber and was interleaved between each pair of ±45° oriented graphite filament layers (total of four individual layers). The single stage curing of the web and cap sections is unique. Slight twisting due to fiber orientation was typical for the glass filament and graphite filament reinforced test beams after curing, but this was significantly reduced in the beam using the asbestos paper in the web section.

Failure mode description

The typical failure mode for the epoxy-graphite or epoxy-glass filament test beams using a flexible resin matrix was usually a diagonal bending failure in the web as it buckled.

Flat laminate flexural tests run on E-glass epoxy laminates with interleaved layers of 3-mil asbestos indicated that higher ultimate loads could be expected from using this approach in the web section of the tension field beams being tested.

The graphite-asbestos/epoxy beam test was the first of the series to fail in an apparent primary tension failure mode, rather than the bending mode previously described. Large gaps ($>\frac{1}{32}$ in.) between the graphite fibers were very obvious in the web section of the graphic/asbestos epoxy beam. The failure mode of this test beam gave further evidence of the efficiency of the asbestos fiber mat to transfer the high stress loads even though the composite was of poor quality.

EXAMPLE 3

Graphite-asbestos/polyimide composites

The use of the 3 mil asbestos paper as an interlayer reinforcement for graphite/polyimide laminates yielded transverse tensile strength properties approximately 2.6 times greater than those measured for the graphite/polyimide laminate without the asbestos. The graphite-asbestos/polyimide laminates were made by precompacting the 3 mil asbestos paper with each lamina prior to and after laminate layup construction. Preliminary test data is given in Table 2 to show the effect of using asbestos paper as an interlayer reinforcement.

imide "web skins" and honeycomb web core in the sandwich beam only. The general fabrication procedure for the sandwich beam was as follows:

(1) Precompaction of the unidirectional graphite-asbestos/polyimide cap layups at 150° F.±10° F. for 10 to 15 minutes under 25 p.s.i.g.

(2) Layup of each half of the web skin (−45, +45) over the male mandrels.

(3) Prepare honeycomb core surfaces by priming with polyimide adhesive primer folowed by a layup of one layer of 3-mil asbestos paper impregnated with the polyimide adhesive. The assembly was heated in an oven at 160° F.±10° F. for 10 to 15 minutes, and the excess adhesive removed from the outer asbestos paper layer surfaces.

(4) Each set of graphite-asbestos/polyimide web skins were then mated to each side of the honeycomb beam web core, precompacted in a hydraulic press (10–15 minutes, 150° F.±10° F., 25 p.s.i.g.).

(5) After bolting the two male mandrel counterparts together, the unidirectional graphite/asbestos-polyimide top and bottom caps tapes were located in place and precompacted in a hydraulic press.

(6) The total assembly was then vacuum-bagged and cured two hours at 350° F.±10° F. using a heat-up rate of 1° to 2° F./minute and staging at 225° F.±5° F. for 25 to 30 minutes prior to heating to 350° F.

(7) The ends of the beam were trimmed and the visual appearance of the beam was excellent.

Figure 6:
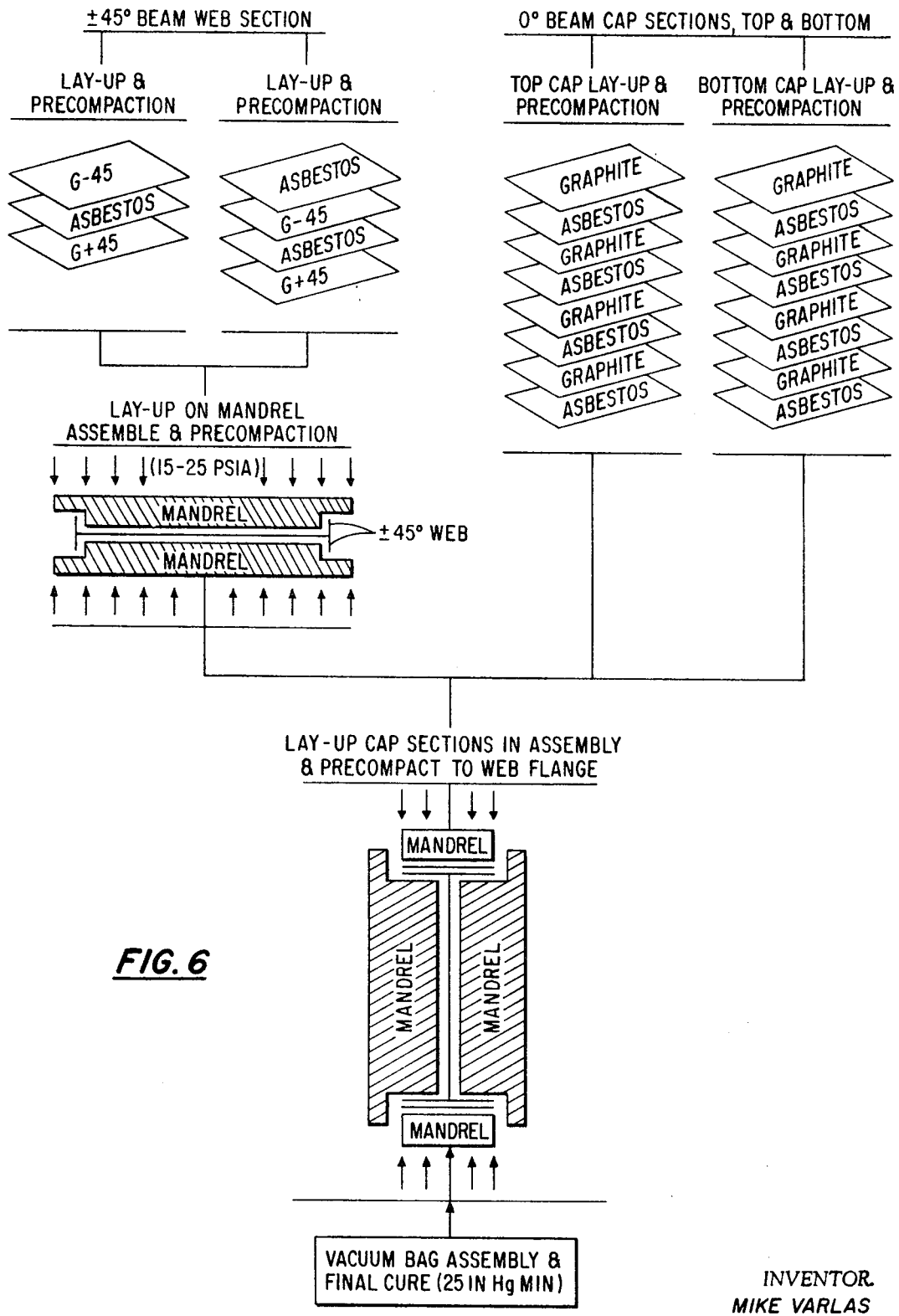
FIG. 6 is a diagrammatic illustration of the fabrication sequence for an I-beam assembly.

The fabrication procedure for the I-beam article was identical to those used for the sandwich beam except those steps related to the honeycomb core were deleted. This part was also of excellent visual condition, and the specific gravity of the total part, as measured by the displacement of water method, was 1.58 gms./cc., or 0.57 lb./cu. in. The calculated graphite fiber volume was 55%. A general schematic outline of the fabrication sequence used in the fabrication of the graphite-asbestos/polyimide I-beam section and sandwich core beam is shown in FIG. 6.

Stiffened panel

The stiffened panel was made from graphite fiber and 3 mil asbestos paper impregnated with polyimide resin.

TABLE 2.—EFFECT OF 3 MIL ASBESTOS PAPER LAMINA REINFORCEMENT

| Material system | Graphite vol. (percent) | Property | Ultimate (K s.i.) | Modulus (E×10) p.s.i.⁶ |
|---|---|---|---|---|
| Graphite-asbestos/polyimide | 45 | Tension (trans.) | 7.8 | 1.3 |
| Graphite/polyimide | 48 | do | 2.9 | 1.0 |
| Do | 56 | do | 5.1 | 0.8 |
| Graphite-asbestos/polyimide | 58 | Shear (interlam.) | 10.6 | |
| Graphite/polyimide | 48 | do | 9.2 | |

Several demonstration articles were fabricated using graphite-asbestos/polyimide structural material. Three (3) mil thick asbestos/polyimide prepreg paper was used as an interlayer reinforcement and fabrication aid. The selected articles were representative of typical subelement configurations used in aircraft structural application, and required forming capability unique for high Young's modulus structural materials. They are:

(1) I-beam section
(2) Sandwiched beam
(3) Stiffened panel

I-beam and sandwich beam articles

The I-beam and sandwich beam process demonstration articles were of the same basic material construction except honeycomb was used as a web core in the sandwich beam.

The sandwich beam and I-beam articles consisted of unidirectional caps, ±45 degree oriented graphite-poly- The panel skin consisted of 4 plies of graphite-asbestos/polyimide widegoods oriented ±45°, while the unidirectional hat section stringers consisted of nine (9) plies of graphite asbestos/polyimide tapes cut from widegood sheets. The individual lamina for both the panel skin and stringers were precompacted for 10 to 15 minutes at 140° F.±10° F. under 45±5 p.s.i.g. pressure. The general fabrication procedure for the stiffened panel assembly was as follows:

(1) The ±45° oriented panel skin layup was precompacted and cured in a press using vacuum-bag pressure (25 in. Hg min.) only up to and including 50 minute staging cycle at 225° F.±5° F. using a heat-up rate of 1° to 2° F./minute, and after applying 75 p.s.i.g. pressure, heat-up continued and cure terminated after 2 hours at 350° F.±10° F. The part was cooled below 150° F. prior to release of pressure. The general appearance of the panel was good.

(2) The unidirectional graphite-asbestos/polyimide tapes for the hat section stringers were laid up on a male tool and each layer was precompacted in place under vacuum-bag pressure (25 in. Hg min.) at room temperature. After precompacting, the total layup under 45±5 p.s.i.g. autoclave pressure, the assembly was then vacuum-bagged and cured in an oven at 350° F.±10° F. for 2 hours using a heat-up rate of 1° to 2° F./minute with a staging cycle at 225° F.±5° F. for 30 minutes during the heat-up to 350° F.±10° F. After curing at 350° F. for two hours, the part was cooled below 150° F. prior to release of pressure. The general appearance of the stringers was good.

(3) The bonding surfaces of the unidirectional graphite-asbestos/polyimide composite stringers and ±45° oriented skin panel were prepared for bonding by light sanding followed by wiping with a cloth lightly dampened with solvent, and priming with the polyimide primer. Three (3) mil metal wire was located at several locations in the bond line to control the glue line thickness. Final adhesive cure was done in a hydraulic press using approximately 15 p.s.i.g. and a heat cure of ninety (90) minutes at 350° F.±10° F.

Although specific embodiments of the present invention have been described herein, it is not intended to limit the invention solely thereto, but to include all of the obvious variations and modifications within the spirit and scope of the appended claims.

What I claim is:
1. A graphite fiber reinforced hybrid laminate comprising:
   a plurality of first and second reinforcing layers in an alternating stacked relationship;
   said first layers comprising a material selected from the group consisting of mica and chrysotile asbestos;
   said second layers comprising graphite filaments;
   said stack being pressure bonded within a resin matrix.
2. The laminate of claim 1 wherein said matrix comprises a resin selected from the group consisting of epoxy and polyimide resins.
3. The laminate of claim 1 wherein said graphite filaments have average diameters of about 0.0003 inch.
4. The laminate of claim 1 wherein said first layers comprise chrysotile absestos paper containing from about 15 to about 20% chopped glass fibers and having a thickness of about 0.003 inch.
5. The laminate of claim 1 wherein said first layer comprises chrysotile absestos paper having its greater strength direction oriented normal to the orientation of said graphite filaments.
6. The laminate of claim 1 wherein said first layer comprise mica mats each having a thickness of about 0.004 inch.

References Cited
UNITED STATES PATENTS

| | | | |
|---|---|---|---|
| 3,301,742 | 1/1967 | Noland et al. | 161—170 |
| 3,573,086 | 3/1971 | Lambdin | 161—182 |
| 3,026,222 | 3/1962 | Rogers et al. | 161—184 X |
| 3,556,925 | 1/1971 | Mertens | 161—171 X |
| 2,593,146 | 4/1952 | Leigh | 161—263 |
| 3,239,403 | 3/1966 | Williams et al. | 156—275 |
| 3,416,995 | 12/1968 | Stelchek | 162—284 |
| 3,458,389 | 7/1969 | Mertens | 161—170 |
| 3,462,340 | 8/1969 | Hough | 161—59 |
| 3,531,353 | 9/1970 | Hartzell et al. | 161—182 X |
| 3,558,350 | 1/1971 | Fincke et al. | 117—132 |
| 3,551,247 | 12/1970 | Feakes | 161—182 X |
| 3,565,740 | 2/1971 | Lazar et al. | 161—59 X |
| 3,579,415 | 5/1971 | Allen et al. | 161—182 |

HAROLD ANSHER, Primary Examiner

U.S. Cl. X.R.

161—165, 170, 171, 182, 185, 205, 227, 257